(12) United States Patent
Deary et al.

(10) Patent No.: US 7,136,136 B2
(45) Date of Patent: *Nov. 14, 2006

(54) LIQUID CRYSTAL ASSEMBLY AND METHOD OF MAKING

(75) Inventors: Randall J. Deary, Littleton, MA (US); Peter J. Miller, Newburyport, MA (US)

(73) Assignee: Cambridge Research and Instrumentation, Inc., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/055,240

(22) Filed: Feb. 10, 2005

(65) Prior Publication Data

US 2005/0134792 A1    Jun. 23, 2005

Related U.S. Application Data

(63) Continuation of application No. 10/144,362, filed on May 13, 2002.

(60) Provisional application No. 60/346,329, filed on Jan. 7, 2002, provisional application No. 60/290,366, filed on May 11, 2001.

(51) Int. Cl.
    G02F 1/1333    (2006.01)
(52) U.S. Cl. .................................. 349/158; 349/160
(58) Field of Classification Search ................ 349/158, 349/160
    See application file for complete search history.

(56) References Cited

U.S. PATENT DOCUMENTS

| | | | |
|---|---|---|---|
| 4,364,039 A | 12/1982 | Penz | |
| 4,832,460 A | 5/1989 | Fujimura et al. | |
| 5,257,122 A | 10/1993 | Dubal et al. | |
| 5,276,747 A | 1/1994 | Pan | |
| 5,477,351 A | 12/1995 | Takahara et al. | |
| 5,557,692 A | 9/1996 | Pan et al. | |
| 5,953,087 A | 9/1999 | Hoyt | |
| 6,018,380 A | 1/2000 | Hu et al. | |
| 6,172,730 B1 | 1/2001 | Fujita | |
| 6,391,137 B1 | 5/2002 | Matsushima | |
| 6,535,257 B1 | 3/2003 | Miller | |
| 6,650,395 B1 * | 11/2003 | Matsuo | 349/158 |
| 2003/0184705 A1 | 10/2003 | Murade et al. | |

FOREIGN PATENT DOCUMENTS

| | | |
|---|---|---|
| FR | 2 788 349 | 7/2000 |
| JP | 05249423 | 9/1993 |
| JP | 06018940 | 1/1994 |
| JP | 09218461 | 8/1997 |
| JP | 2000172189 | 6/2000 |
| WO | WO01/81990 A1 | 11/2001 |

OTHER PUBLICATIONS

Copy of European Search Report for EP Patent Application No./Patent No. 02726867.1-2205/PCT/US0215161 dated Jan. 20, 2006 by Examiner I. Stang.

"New LCD Structure", *IBM Technical Disclosure Bulletin*, vol. 37, No. 06B (Jun. 1994).

European Search Report for Application No./Patent No. 02726867.1 - 2205/PCT/US0215161 by Examiner E. Stang dated Apr. 4, 2006.

* cited by examiner

*Primary Examiner*—James A. Dudek
(74) *Attorney, Agent, or Firm*—Fish & Richardson P.C.

(57) ABSTRACT

A method for producing a liquid crystal device, the method including: assembling two substrates to form at least one liquid crystal cell; and removing material from a first one of the assembled substrates to produce a first region of the first substrate that is thinner than a second region of the first substrate.

21 Claims, 16 Drawing Sheets

LIQUID CRYSTAL ASSEMBLY AND METHOD OF MAKING

CROSS-REFERENCE TO RELATED APPLICATIONS

This application is a continuation application of U.S. application Ser. No. 10/144,362 entitled "LIQUID CRYSTAL ASSEMBLY AND METHOD OF MAKING" and filed May 13, 2002, the contents of which are incorporate herein by reference, which in turn claims priority from the following U.S. provisional patent applications: Ser. No. 60/346,329, entitled "Method for fabricating liquid crystal cells with wedged outer faces" by Randy Deary and Peter J. Miller, filed Jan. 7, 2002, and Ser. No. 60/290,366, entitled "Stress-relief of Liquid Crystal Cells" by Randall J. Deary, filed May 11, 2001. The contents of both provisional application are incorporated herein by reference.

BACKGROUND

The invention relates to liquid crystal devices and methods of making liquid crystal devices. Liquid crystal technology has many applications. For example, liquid crystal devices can be used to selectably vary the retardance, intensity, and/or polarization of an incident beam. Such devices may include a single liquid crystal component or multiple liquid crystal components in optical series. Each liquid crystal component includes two substrates sandwiching a layer of liquid crystals, and the substrates each support an electrode. An electric field can be applied across the liquid crystal layer via the electrodes to cause a change in the orientation of the liquid crystals, which in turn causes an incident beam to see a change in the retardance of the liquid crystal layer. The component(s) can be combined with additional optical elements (e.g., polarizers, waveplates, fixed retarders, etc.) for modifying the output of an incident beam. As is common in the art, such liquid crystal devices can be configured in both reflective and transmissive arrangements.

One problem that can occur when using liquid crystal devices is that undesired reflections from one or more interfaces in the device can interfere with the main output beam and degrade the optical performance of the device. Such interference effects can be especially significant for a coherent input beam. Sometimes a wedge is introduced into the device to reduce the overlap between the main output beam and one or more of the reflected beams.

A second problem that can occur is thermal expansion of the liquid crystals within the device. Such expansion can degrade the optical performance of the device and ultimately lead to mechanical failure (e.g., failure of the perimeter seal).

Another consideration relates to the manufacturability of such liquid crystal devices. For many applications (e.g., telecom applications), the liquid crystal device should be small and compact. Unfortunately, it can be difficult to achieve robust and economical manufacture when handling and assembling such small components.

SUMMARY

The inventors have realized that after two substrates are assembled into a liquid crystal cell, one or both of the substrates can be ground to remove material and shape the substrate(s). Notably, such grinding can be accomplished without degrading the liquid crystal cell. The grinding is especially robust when, for example, the liquid crystal cell is filled with liquid crystals, because the liquid crystals provide hydrostatic support to the assembled substrates.

The shaping may include forming a wedge in one or both of the substrates to reduce interference effects caused by undesired reflections. Furthermore, the shaping may include thinning a region of one or both of the substrates such that it deforms to accommodate thermal expansion of the liquid crystals and thereby provides stress relief. In either case, at least one of the substrates adjacent the liquid crystal layer has a first region thinner than a second region of the substrate. Because the substrate is ground after it is assembled into a cell, it easier to handle because it is supported by the rest of the cell, which, in addition to the opposite substrate and liquid crystal layer, may further include one or more additional optical components secured to the cell adjacent the opposite substrate. Moreover, because the substrate is supported, it may be initially thin (e.g., less than 1.2 mm), and a portion of it may be ground to be even thinner (e.g., less than 1.0 mm, or even less than 0.5 mm). This can lead to a more compact device.

Furthermore, because the shaping can occur after the liquid crystal cell is assembled, the liquid crystal cell can be produced from an array of liquid crystal cells mass produced from large, substantially planar substrates. Such planar substrates lend themselves to large scale lithography techniques that can be used to pattern the substrates with electrodes for multiple cells. The patterned substrates can then be assembled into an array of liquid crystal cells, and subsequently die cut to produce individual cells or sub-arrays of cells (e.g., strips of cells) using the highly-developed tools, fixtures, and processes developed by the display industry. For example, such tool and processes are used in the steps of depositing a suitable alignment layer, substrate lamination, and filling with liquid crystal.

In some embodiments, rather than shape individual liquid crystal cells, the shaping may be applied to one (or both) of the substrates of an array or sub-array of liquid crystal cells, which are then subsequently divided into individual cells. This may ease handling of the cells during the grinding process by increasing the size of the object being ground. Furthermore, in additional embodiments, shaping may be applied to a large substrate prior to its assembly into an array of liquid crystal cells, which are subsequently divided into individual cells.

In general, in one aspect, the invention features a method for producing a liquid crystal device. The method includes: assembling two substrates to form at least one liquid crystal cell; and removing material from a first one of the assembled substrates to produce a first region of the first substrate that is thinner than a second region of the first substrate.

Embodiments of the method may include any of the following features

The method may further include filling the cell with liquid crystals. Furthermore, the the cell may be filled with liquid crystals before the material is removed from the first substrate, or after the material is removed from the first substrate.

Removing material from the first substrate may include grinding the first region of the first substrate. It may further include polishing the first region of the first substrate. During the grinding, the temperature of the first substrate may be preferably maintained to within 5° C. of a nominal temperature.

Assembling the two substrates may include forming an array of liquid crystal cells. The array may be, for example, a one-dimensional array (e.g., a strip) or a two-dimensional array. The method may further include dividing the array of liquid crystal cells into separate liquid crystal cells, wherein the removal of the material from the first substrate includes removing material from the first substrate of at least one of the separated liquid crystal cells. Alternatively, the array of liquid crystals may be a two-dimensional array and the method may further include dividing the two-dimensional array into separate one-dimensional strips of liquid crystal cells, wherein the removal of the material from the first substrate includes removing material from the first substrate of at least a first one of the strips of liquid crystal cells. In such embodiments, the method may further include dividing the first strip of liquid crystal cells into separate liquid crystal cells after removing the material from the first substrate. Finally, the method may further include dividing the array of liquid crystal cells into separate liquid crystal cells after removing the material from the first substrate. In such embodiments, the first and second regions of the first substrate may extend across multiple ones of the liquid crystal cells in the array.

Prior to the assembly of the liquid crystal cell, the two substrates may planar substrates. After the removal of the material, the first region of the first substrate may have a thickness less than 1.2 mm, or even less than 1.0 mm. Also, the method may include patterning each substrate with at least one electrode for use with the liquid crystal cell.

In some embodiments, the first region of the first substrate is sufficiently thin relative to the second region of the first substrate to relieve stress caused by thermal expansion and contraction of liquid crystals in the liquid crystal cell over a range of operating temperatures. For example, the range of operating temperatures may span at least 30° C. (e.g., the range of operating temperatures may be from about 5° C. to at least 70° C.). The second region of the first substrate may be at least 20% thicker than, or even twice as thick as, the first region of the first substrate.

In some embodiments, the removal of the material may introduces a wedge to the first substrate (e.g., the wedge may define a wedge angle of at least 0.25°). The wedge may be used to reduce interference effects caused by an undesired reflection from the first substrate during use of the liquid crystal cell. The wedge may include the thinner first region and the thicker second region. Alternatively, or in addition, the first region of the first substrate is sufficiently thin relative to the second region of the first substrate to relieve stress caused by thermal expansion and contraction of liquid crystals in the liquid crystal cell over a range of operating temperatures. In such embodiments, the wedge may extend over at least a portion of the second region.

The method may further include removing material from the second assembled substrate to produce a first region of the second substrate that is thinner than a second region of the second substrate.

The method may further include securing an optical component to the liquid crystal cell in series with an optical aperture of the liquid crystal cell. The optical component may be, e.g., a retarder, a polarizer, another liquid crystal cell, or an optical window. For example, the optical window may be used to stiffen at least a portion of the cell. Instead of, or in addition to, securing an optical component to the cell, the method may further include securing a stiffening component (e.g., a metal) to at least a portion of the cell. In general, the optical component or stiffening component may be secured to the cell adjacent the second substrate prior to removing the material from the first substrate, or the optical component or stiffening component may be secured to the cell after removing the material from the first substrate. The stiffening component and/or optical component may be secured to only the first substrate, only the second substrate, or to both substrates.

In those embodiments that involve an array of liquid crystal cells, the method may further include securing an optical component to be in optical series with the array of liquid crystal cells. The optical component may be, e.g., a retarder, a polarizer, another liquid crystal cell, or an optical window. For example, the optical window may be used to stiffen at least a portion of the cell array. Instead of, or in addition to, securing an optical component to the cell array, the method may further include securing a stiffening component (e.g., a metal) to at least a portion of the cell array. In general, the optical component or stiffening component may be secured to the cell array adjacent the second substrate prior to removing the material from the first substrate, or the optical component or stiffening component may be secured to the cell array after removing the material from the first substrate. The stiffening component and/or optical component may be secured to only the first substrate, only the second substrate, or to both substrates. The method may further include dividing the array of cells and the secured optical component into separate liquid crystal devices.

In general, in another aspect, the invention features a method for producing a liquid crystal device. The method includes: assembling two substrates to form at least one liquid crystal cell; and removing material from a first one of the assembled substrates to produce a wedge along the first substrate.

In general, in another aspect, the invention features a method for producing a liquid crystal device. The method includes: assembling two substrates to form at least one liquid crystal cell; and removing material from a first one of the assembled substrates to produce a first region of the first substrate that is thinner than a second region of the first substrate, wherein the first region of the first substrate is sufficiently thin relative to the second region of the first substrate to relieve stress caused by thermal expansion and contraction of liquid crystals in the liquid crystal cell over a range of operating temperatures.

In general, in another aspect, the invention features a method for producing multiple liquid crystal devices. The method includes: providing two substrates; removing material from a first one of the substrates to produce a first region of the first substrate that is thinner than a second region of the first substrate; assembling the substrates to form an array of liquid crystal cells; and after the substrate material is removed from the first substrate, dividing the array of liquid crystal cells into separate liquid crystal cells. The removal of the material may occur before the assembly of the substrates into the array liquid crystal cells, or the removal of the material may occur after the assembly of the substrates into the array liquid crystal cells. The method may further include any of the other method features described above.

In general, in another aspect, the invention features a liquid crystal device including: two unitary substrates sandwiching a layer of liquid crystals, wherein each substrate supports at least one electrode, wherein a first one of the substrate has a first region that is thinner than a second region of the first substrate, and wherein the first region of the first substrate has a thickness less than 1.2 mm.

Embodiments of the liquid crystal device may include any of the following features.

The first region of the first substrate may be sufficiently thin relative to the second region of the first substrate to relieve stress caused by thermal expansion and contraction of the liquid crystals over a range of operating temperatures.

For example, the range of operating temperatures may span at least 30° C. (e.g., the range of operating temperatures may be from about 5° C. to at least 70° C.). The second region of the first substrate may be at least 20% thicker than, or even twice as thick as, the first region of the first substrate.

The first substrate may includes a wedge (e.g., the wedge may define a wedge angle of at least 0.25°). The wedge may be used to reduce interference effects caused by an undesired reflection from the first substrate during use of the liquid crystal device. The wedge may include the thinner first region and the thicker second region. Alternatively, or in addition, the first region of the first substrate is sufficiently thin relative to the second region of the first substrate to relieve stress caused by thermal expansion and contraction of the liquid crystals over a range of operating temperatures. In such embodiments, the wedge may extends over at least a portion of the second region.

The second substrate may include a first region that is thinner than a second region of the second substrate.

The first region of the first substrate may have a thickness less than 1.2 mm, or even less than 1.0 mm.

The device may further include an optical component secured in optical series with at least a portion of the liquid crystal layer. The optical component may be, e.g., a retarder, a polarizer, another liquid crystal cell, or an optical window. For example, the optical window may be used to stiffen at least a portion of the cell. Instead of, or in addition to, an optical component being secured to the cell, the device may include a stiffening component (e.g., a metal) secured to at least a portion of the cell. The stiffening component and/or optical component may be secured to only the first substrate, only the second substrate, or to both substrates.

In general, in another aspect, the invention features a liquid crystal device including: two unitary substrates sandwiching a layer of liquid crystals, wherein each substrate supports at least one electrode, wherein a first one of the substrates has a wedge and a thickness less than 1.2 mm.

In general, in another aspect, the invention features a liquid crystal device including: two unitary substrates sandwiching a layer of liquid crystals, wherein each substrate supports at least one electrode, wherein the first substrate has a first region that is thinner than a second region of the first substrate, and wherein the first region of the first substrate is sufficiently thin relative to the second region of the first substrate to relieve stress caused by thermal expansion and contraction of the liquid crystals over a range of operating temperatures.

The details of one or more embodiments of the invention are set forth in the accompanying drawings and the description below. Other features, objects, and advantages of the invention will be apparent from the description and drawings, and from the claims.

DETAILED DESCRIPTION

Liquid crystal devices are described in which material is removed from at least one of the substrates that sandwich the liquid crystal layer to form a shaped substrate that addresses one or both of the problems of interference from spurious reflections and thermal expansion of the liquid crystals. For example, the shaped substrate can be wedged to reduce interference from spurious reflections. Furthermore, the substrate can be shaped to produce a stress-relief region that deforms to accommodate thermal expansion of the liquid crystals.

The substrate can be shaped by grinding and polishing it. Notably, such grinding and polishing can be applied to the substrate after the assembly of the liquid crystal cell. As a result, large substrates that are initially planar may be used to mass produce an array of liquid crystal cells prior to the grinding and polishing. Such mass production is more economical and tends to produce more robust cells.

In the description that follows, we first discuss a number of embodiments of the devices, and then discuss suitable methods for producing such devices.

Figure 1A:
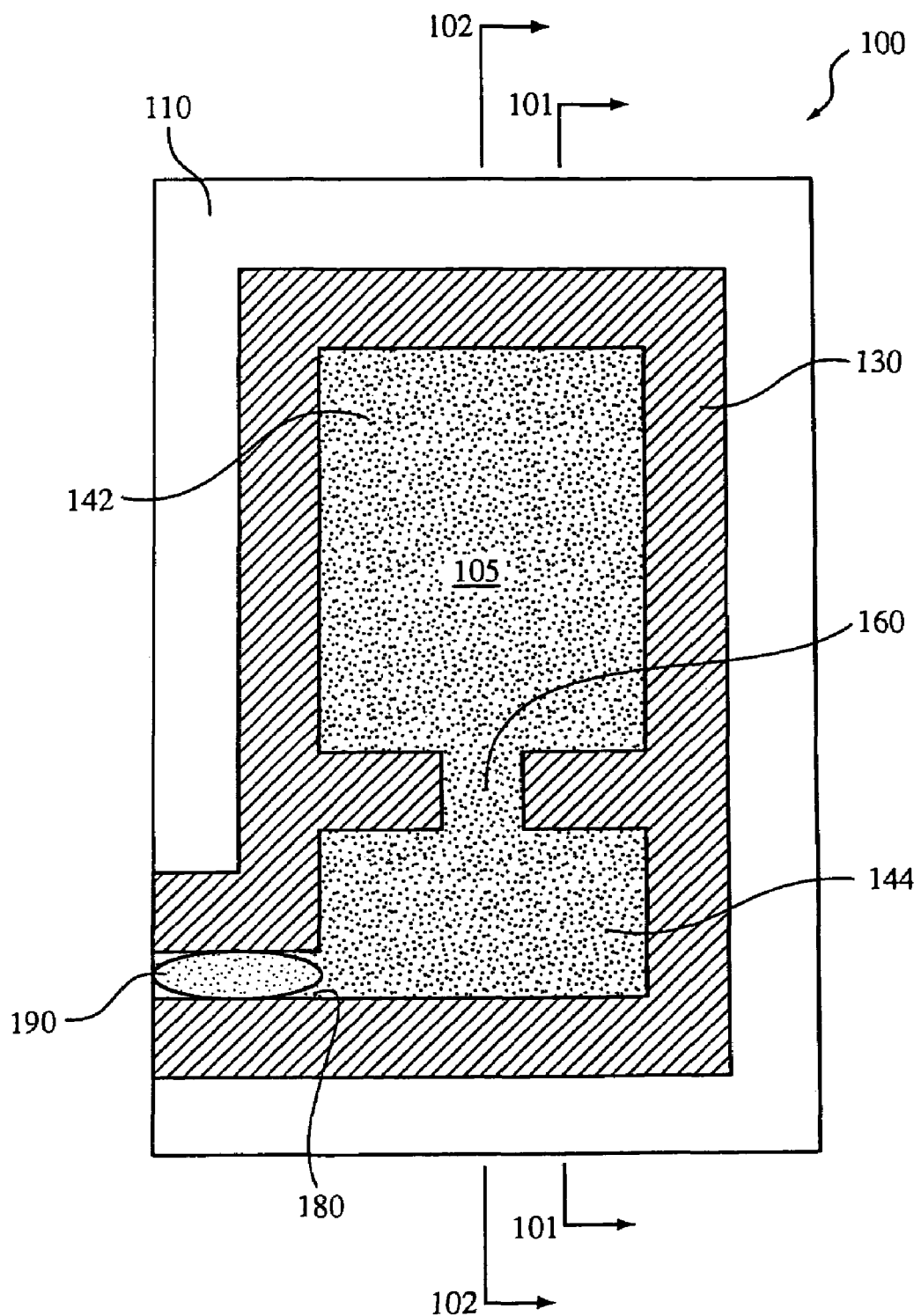
FIG. 1A is a front view of a liquid crystal device with integral stress relief.
Figure 1B:
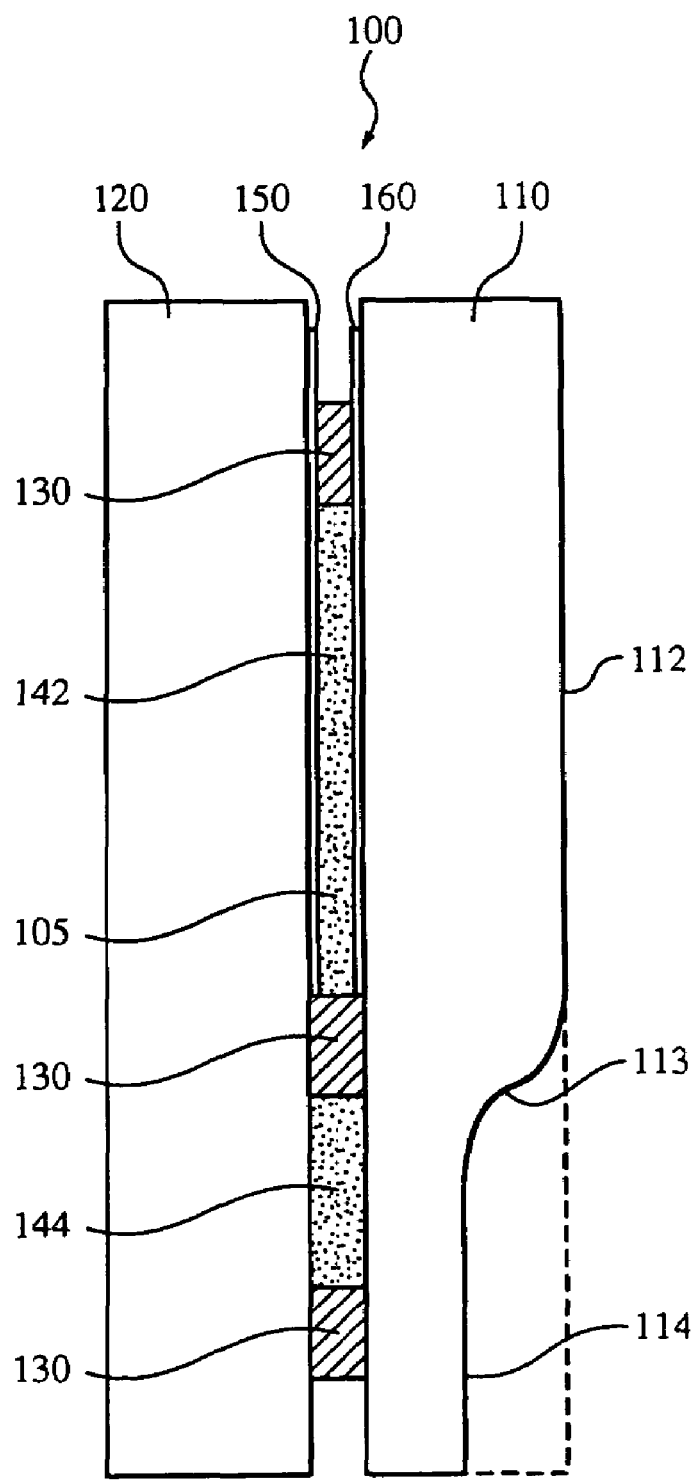
FIGS. 1B–C are side views of a liquid crystal device with integral stress relief.
Figure 1C:
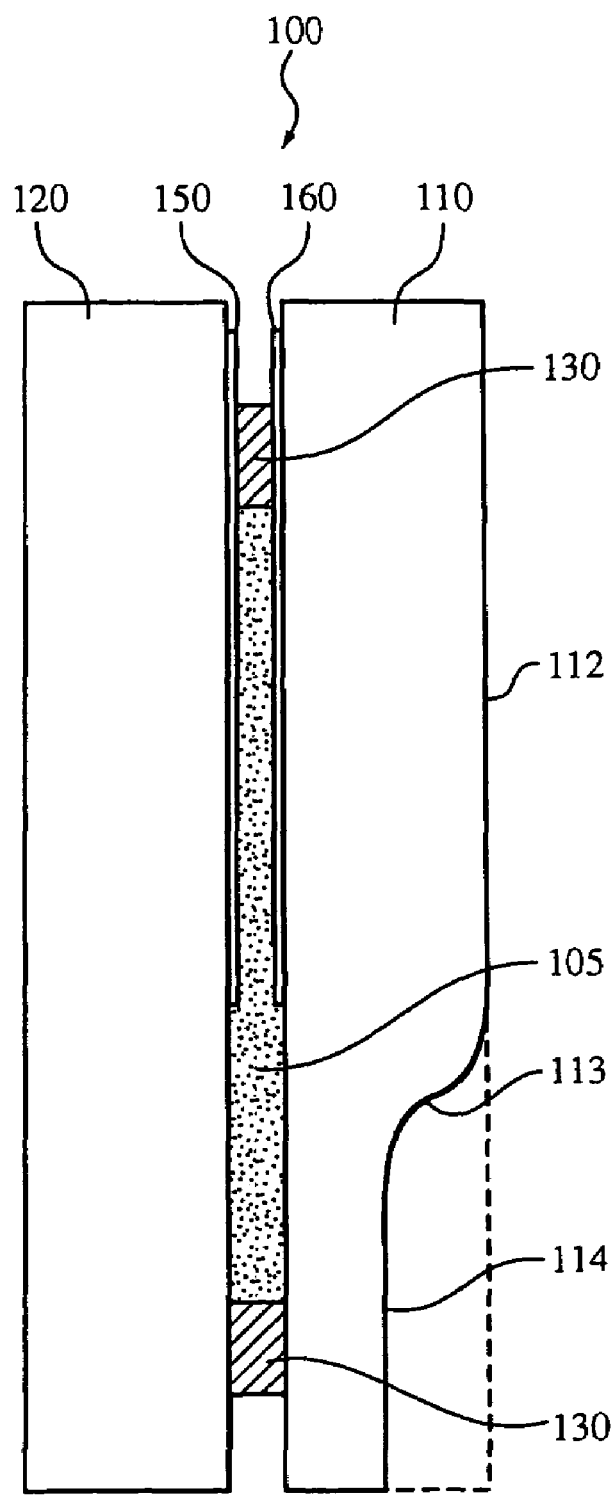

Referring to FIG. 1A–C, a liquid crystal device 100 is shown. Device 100 includes two substrates 110 and 120 that form the front and back of the device respectively. The substrates 110 and 120 are held together by adhesive bead 130. The substrates and the adhesive bead 130 form a first and second volumes 142 and 144 respectively. A passage 160 connects the two volumes. The volumes are filled with a liquid crystal 105. An inlet 180 in the adhesive bead 130 allows the introduction of the liquid crystal into the two volumes 142 and 144 and is subsequently sealed by a plug 190. Referring to FIGS. 1B and 1C, cross sectional views of device 100 are shown about axes 101 and 102 respectively. Substrate 110 includes a first portion 112 and a second portion 114. Portion 114 is thinner than portion 112. The first portion 112 corresponds to the portion of the substrate 110 that forms one of the walls for the first volume 142. The second portion 114 corresponds to the portion of substrate 110 that forms one of the walls for the second volume 144.

In some embodiments, the liquid crystal layer formed in volume 142 is designed to interact with light passing through the device and is known as the optical or display portion of the device. Typically, the interaction of light with liquid crystal depends on the alignment of the liquid crystal molecules. The inner surfaces of the substrates may be treated to enhance the alignment of the liquid crystals.

Examples of such layers are buffed polymer alignment films. Furthermore, the optical interaction is modulated by way of electric fields that modulate the alignment of the liquid crystals. The inner surface of substrates 110 and 120 have electrodes 160 and 150 respectively. Voltages applied to the electrodes produce the electric fields that modulate the interaction of light with the liquid crystal layer. Positioning of the electrodes on the outer surface of the substrates or elsewhere is possible.

In some embodiments, the substrate is patterned to define an array of individually addressable electrodes. Voltages on each of the individual electrodes independently modulate the light interaction in the vicinity of the electrode and thus define a corresponding pixel in the display portion. Controlling the individual voltages spatially modulates the optical properties of the device from pixel to pixel across the display region. Often such device is referred to as a spatial light modulator (SLM). In addition, liquid crystal devices can be either transmissive or reflective type devices. For transmissive type liquid crystal devices, the electrodes are often transparent indium-tin oxide (ITO) electrodes. For reflective type liquid crystal devices, the electrodes on one of the substrates can be a reflective metal layer such as gold. In other embodiments of reflective type liquid crystal devices, both sets of electrodes are transparent and the reflective portion is some other reflective layer for example an external mirror attached to the device.

In most applications the interaction of light with the liquid crystal layer also depends on the thickness of the liquid crystal layer. For example, the retardance, R, of a layer is given by $$R = 2\pi \frac{\Delta n(V) L}{\lambda} \quad [1]$$

wherein $\lambda$ is the wavelength of the light, $\Delta n(V)$ is the voltage dependent birefringence, and L is the thickness of the liquid crystal layer (assuming a single pass device). From Eq. [1] it is clear that if the thickness varies then the performance of the device varies. Furthermore, variations in thickness across the display aperture produce variations in device performance as a function of position. In many embodiments, it is desirable to have a uniform liquid crystal thickness across the display portion. Typical devices have liquid crystal layers with thicknesses for example in the range from about 1 μm to about 30 μm. In some embodiments, the layer thickness varies by no more for example 30 nm. Mechanical spacers (not shown) can aid in maintaining uniform spacing between the substrates during manufacture.

As the temperature of the device changes, the liquid crystal expands and contracts. As the liquid crystal 105 is very nearly incompressible, expansion of the liquid crystal leads to changing pressures on the substrates 110 and 120, the adhesive bead 130 and the plug 190. Such pressures can lead to mechanical failure of liquid crystal devices. Furthermore such pressures can deform the substrates that form the optical display region and thus deform the thickness of the liquid crystal layer.

To reduce the variations in liquid crystal layer thickness and thus variations in optical performance, the second portion 114 of substrate 110 is substantially thinner than the first portion 114 of substrate 110. Portion 114 is also thinner than substrate 120. As a result, the second portion 114 has a stiffness that is substantially less than the stiffness of the first portion 112 of substrate 110 or substrate 120 (assuming they are constructed from materials with similar mechanical properties). As the pressure builds in the device due to thermal expansion of the liquid crystal 105, the second portion 114 deflects outwards increasing the volume available for the liquid crystal and moderating the increase in pressure. This provides a stress relief function for the liquid crystal device.

Similarly as the liquid crystal layer contracts, the internal pressure decreases. Such a pressure drop can lead to cavitation or bubble formation in the liquid crystal layer degrading optical performance. In some embodiments or under extreme operating conditions, such a low internal pressure can even deform the liquid crystal thickness in the optical display region. To avoid such low internal pressures, the second portion 114 deflects inward as the liquid crystal layer contracts with temperature. This moderates the internal pressure of the liquid crystal layer.

The stiffness of portion 114 relative to portion 112 and relative to substrate 120 over a large range of deformations of portion 114 ensures that the stress relief deformation occurs primarily in portion 114 and not appreciably in portion 112. This maintains the uniformity of the liquid crystal layer thickness over a large range of temperatures. Furthermore by moderating both the maximum and minimum pressure inside the device, the stress relief function of portion 114 reduces the probability of pressure related failure of the cell.

The stress relief function is provided by the thickness of portion 114 relative to portion 112 and relative to substrate 120. For example, the thickness of the portion 114 is typically at least 100 microns less than the first portion 112. A transition of thickness between first portion 112 and second portion 114 is formed by connecting portion 113. The connecting portion preferably provides a smooth transition from the thicker portion 112 to the thinner portion 114. This avoids fracturing the substrate 110 as the portion 114 deflects due to changes in the volume of the liquid crystal.

Furthermore, in embodiments that use device 100 adjacent to another optical component (as will be described subsequently), the stress relief function is typically not impeded by a planar optical element that sits flush against portion 112.

In addition to considering the stiffness of the second portion 114 relative to first portion 112 and substrate 120, the relative volumes of volume 142 and volume 144 may also be considered. Given the total volume of the liquid crystal layer at one temperature, the volume at another temperature can be readily calculated. These changes in volume are accommodated by the deformation of the second portion 114. A larger (by area) second portion 114 produces a larger change in volume for the same amount of vertical deflection. In some applications, the area of the second portion can be relevant, for example, when trying to minimize the size of the device. In such cases, a reduction in the area of the second portion can be compensated by a reduction in the stiffness of the second portion.

The design is based on the overall mechanical properties of the expansion region. It includes the area and geometry of the expansion region, as well as the thickness of the glass. The stiffness preferably is kept low enough in absolute terms to permit expansion without the high pressure that could cause mechanical failure, and low enough relative to the aperture that the majority of the deformation occurs in the stress relief portion, and not in the optical display region.

The relationship between the relative volumes, the relative stiffnesses, the failure limits of the cell components, and the operating conditions for the cell is calculated and optimized using well known engineering techniques. For example, commercially available finite-element computer programs such as NASTRAN, from MacNeal, Schwendler Corp., are used to determine the stiffnesses of the cell components using the actual design geometry and materials used. Similarly, the modeling of the deformation of the cell under varying design choices and varying conditions is based on conventional mechanical engineering techniques known to those skilled in the art, such as described by R. D. Cook in Concepts and Application of Finite Element Analysis, (Wiley & Sons, NY, 1989). Given a set of desired performance parameters (for example, size, materials, operating temperature range, thickness uniformity of the liquid crystal layer) such techniques are used to define mechanical proportions of devices with the desired performance.

Figure 2A:
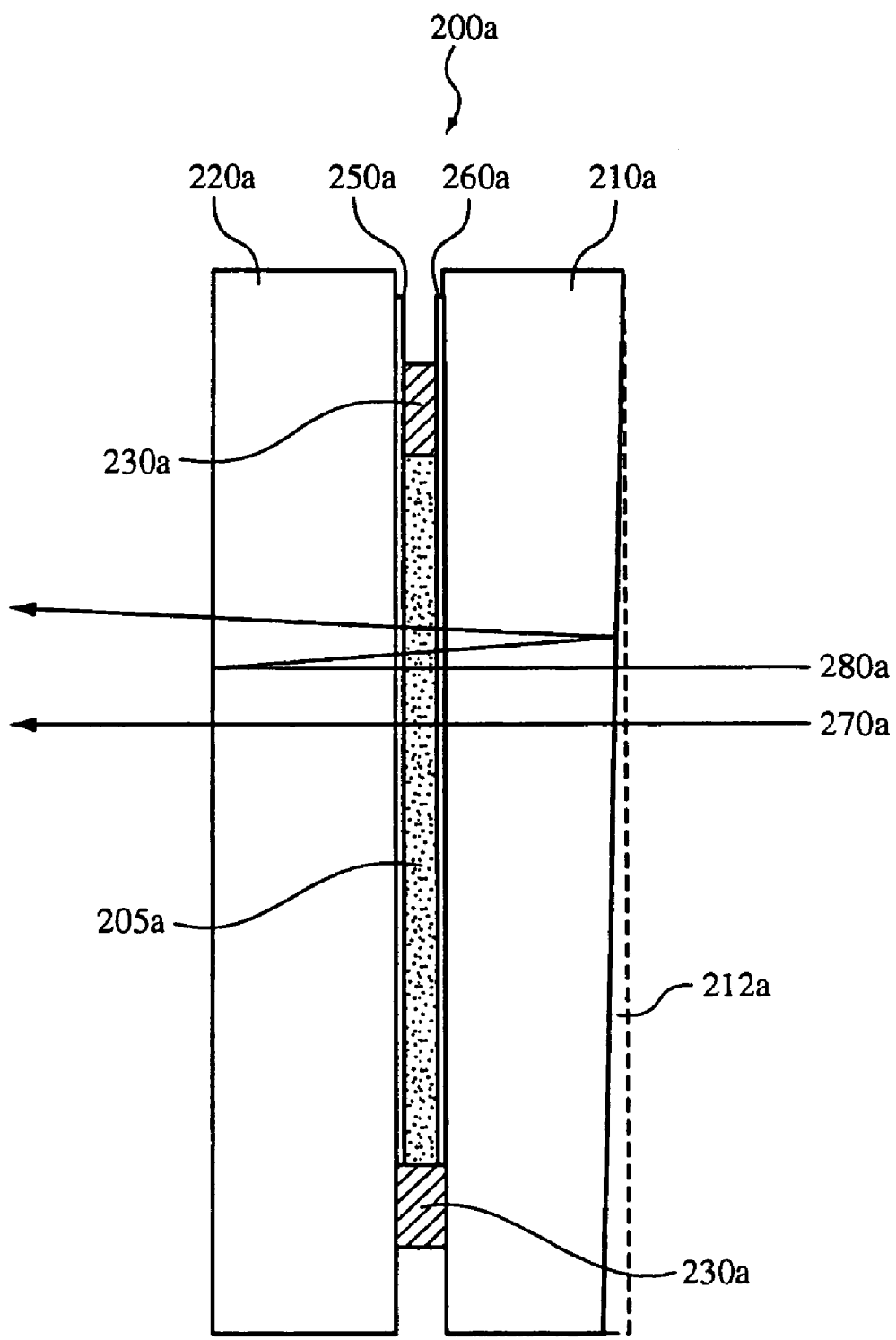
FIGS. 2a–b are side views of a liquid crystal device with an integral wedged substrate.

In addition to concerns about liquid crystal layer uniformity, the optical interfaces in liquid crystal devices lead to spurious reflections. The spuriously reflected beams can interfere with the main beam of the device often degrading optical performance. A wedged surface reduces the interference from such reflections. Referring to FIG. 2A, a liquid crystal 200a device is shown. Similar to device 100, the liquid crystal device has two substrates 210a and 220a joined by adhesive bead 230a. The substrate 210a has a wedged portion 212a. Device is a transmissive type cell with transparent electrodes 250a and 260a. Typically such electrodes are formed from ITO. Two light beams are shown. Beam 270a shows the main beam that passes through the device. A beam 280a results from the spurious reflection of the main beam off the back surface of substrate 220a (the normal reflection should reflect at a normal angle but is drawn at a non normal angle for clarity of the beam path). This beam subsequently reflects from the front surface of wedged substrate 210a and exits the cell. In the case of two parallel surfaces (ie no wedge), such reflections overlap and can interfere. The wedge eliminates the spatial overlap of the two beams by deflecting the unwanted beam out of the optical pathand thus reduces the optical interference.

Figure 2B:
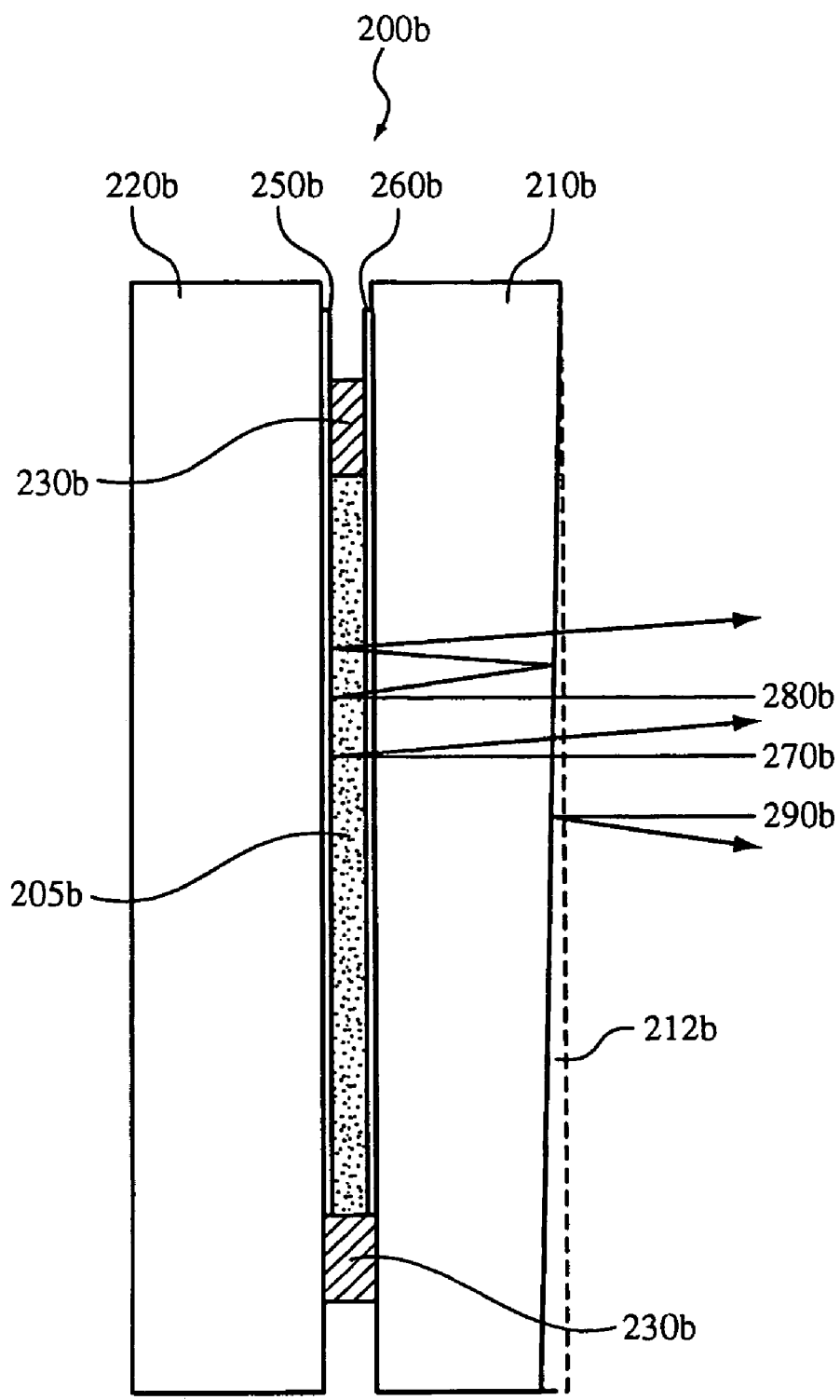

Referring to FIG. 2B, a liquid crystal 200b device is shown. Similar to device 100, the liquid crystal device has two substrates 210b and 220b joined by adhesive bead 230b. The substrate 210b is wedged. The device is a reflective type cell with reflective electrode 250b and transparent electrode 260b. The reflective electrode is typically formed from a reflective metal such as gold. Three light beams are shown. Beam 270b shows the main beam that passes through the liquid crystal layer 205b and is reflected back through the layer and out of the device. Beam 280b results from the spurious reflection of the main beam off the front surface of substrate 210b and the reflection from the reflective electrode 250b. Similarly a beam 290b results from reflection of the main beam of the wedged substrate. The wedge eliminates the spatial overlap of these two beams with the main beam by deflecting them out of the optical path and thus reduces the optical interference. In other embodiments of reflective cells, both electrodes can be transparent and another reflective surface provides the reflectivity. For example, an external mirror can be affixed to the wedged portion 212a of device 200a to form a reflective cell.

A particular embodiment of device 200b is given. The substrates are 0.5 mm thick Corning 1737F glass supplied by Corning Glass, Corning N.Y. Substrate 210b has a size of 8×16 mm while substrate 220b has a size of 12×16 mm. A transparent electrode 260b is on the inner surface of substrate 210b and a reflective gold electrode 250b is on the inner surface of substrate 220b. The gold layer forms the reflective layer. The outer face of substrate 210b is polished to impart a 0.5 degree wedge onto substrate 220b (the methods by which the wedge is formed is discussed below). The wedge is directed along the short axis of substrate 220b.

In yet other embodiments, other wedge angles can be employed with unequal wedges on either substrate oriented along either axis of the face of the substrate. For example, in another embodiment, an 8×12 mm cell is formed from two 0.5 mm substrates. A 0.5 degree wedge is polished on each of the outer faces of the substrates along the same axis but with the wedges in opposite directions. The resulting assembly is wedged by 1 degree and the liquid crystal layer is not parallel to either substrate face. Often such devices are stacked in series with other optical devices such as other liquid crystal devices, retarders, waveplates, and polarizers. In such composite devices, each optical interface generates spurious reflections. Thus the wedging angle of a liquid crystal device 200 can be designed not only to reduce interferences between surfaces within that device but also between surfaces of a composite optical device that includes liquid crystal device 200.

In device 200a, the interfering beam required two reflections from the relatively low reflectivity surfaces. In contrast, in device 200b, the interfering beams required only one low reflectivity reflections. The low reflectivity surfaces are surfaces that are not intended to reflect the main beam but due to an optical interface reflect a smaller spurious beam. Therefore devices similar to device 200b are more susceptible to interference effects. In addition to the reflections already considered in device 200a and 200b, there are a number of surfaces in typical liquid crystal devices that form spurious reflections. Not all pairs of surfaces need to be wedged relative to each other to avoid interference. The spectral separation between peaks in a fringe pattern is related to the optical path difference between the two interfering beams. A small optical path difference results in a low order interference and therefore a large spectral separation between fringe peaks. On the other hand, a large optical path difference leads to high order interference and therefore a small spectral separation. The coherence length of the light being used bounds the upper limit of such high order interferences. In many applications, especially where specific wavelengths are used, the low order/large separation interferences can be suitably filtered from the system by frequency dependent filtering. On the other hand, the higher order interferences with smaller spectral separation become increasingly difficult to filter. In such situations, the integral optical wedging of a substrate discussed above can reduce such high order fringing by sufficiently deflecting one of the beams and reducing interference.

Figure 3:
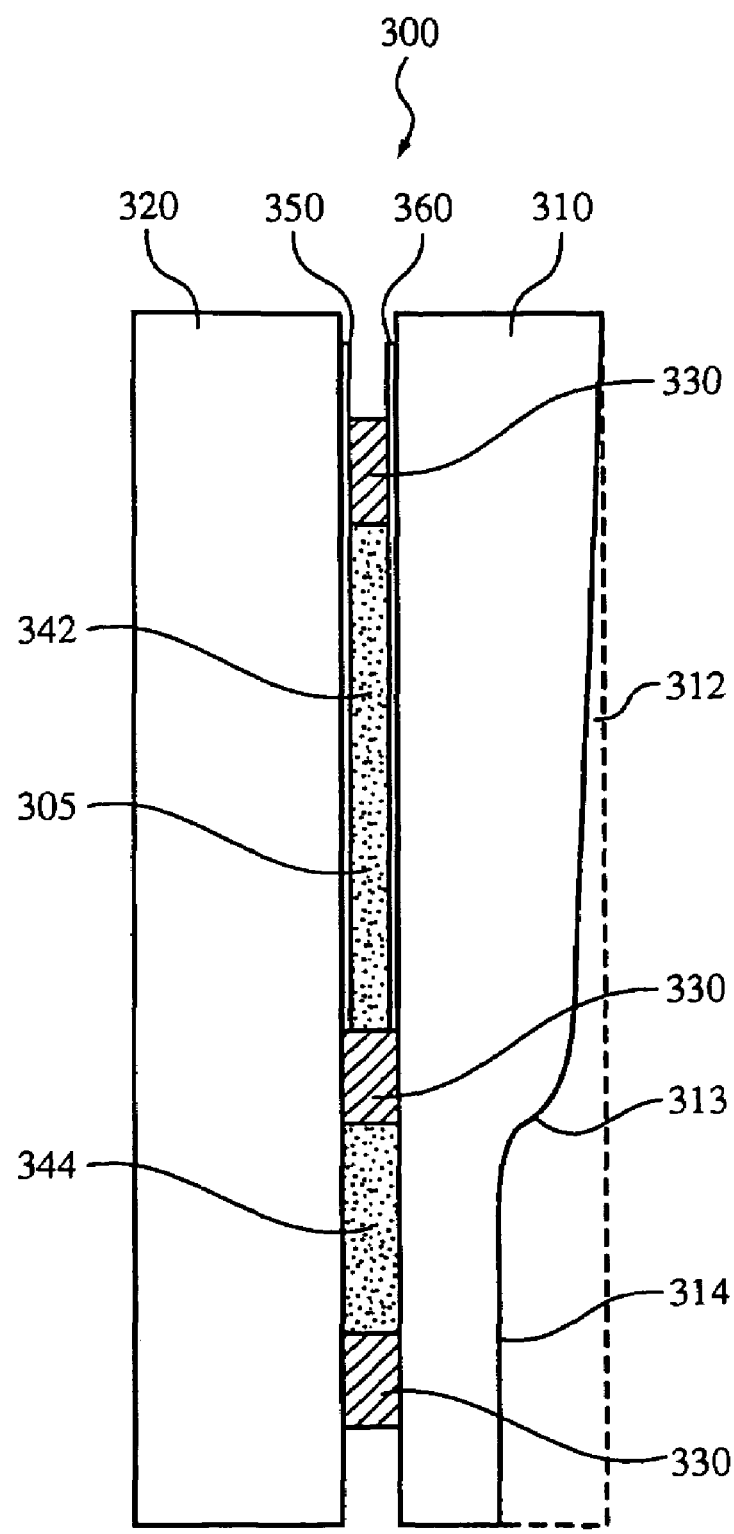
FIG. 3 is a side view of a liquid crystal device with an integral wedged substrate and integral stress relief.

Referring to FIG. 3 a cross sectional view of a liquid crystal device 300 is shown. Device 300 includes features similar to those in devices and 100 and 200. Device 300 includes two substrates 310 and 320 joined by adhesive bead 330. The device has electrodes 350 and 360. A first portion 312 of the substrate 310 is wedged. A second portion 314 of substrate 310 is substantially thinner than substrate 320 and first portion 312 of substrate 310 and thus portion 314 provides a stress relief function for device 300 while the wedge of portion 312 reduces fringing and interference effects. A connecting portion 313 connects portions 312 and 314 and preferably provides a smooth transition between the two portions. Some embodiments of device 300 are transmissive type cells and some embodiments are reflective type cells.

Figure 4:
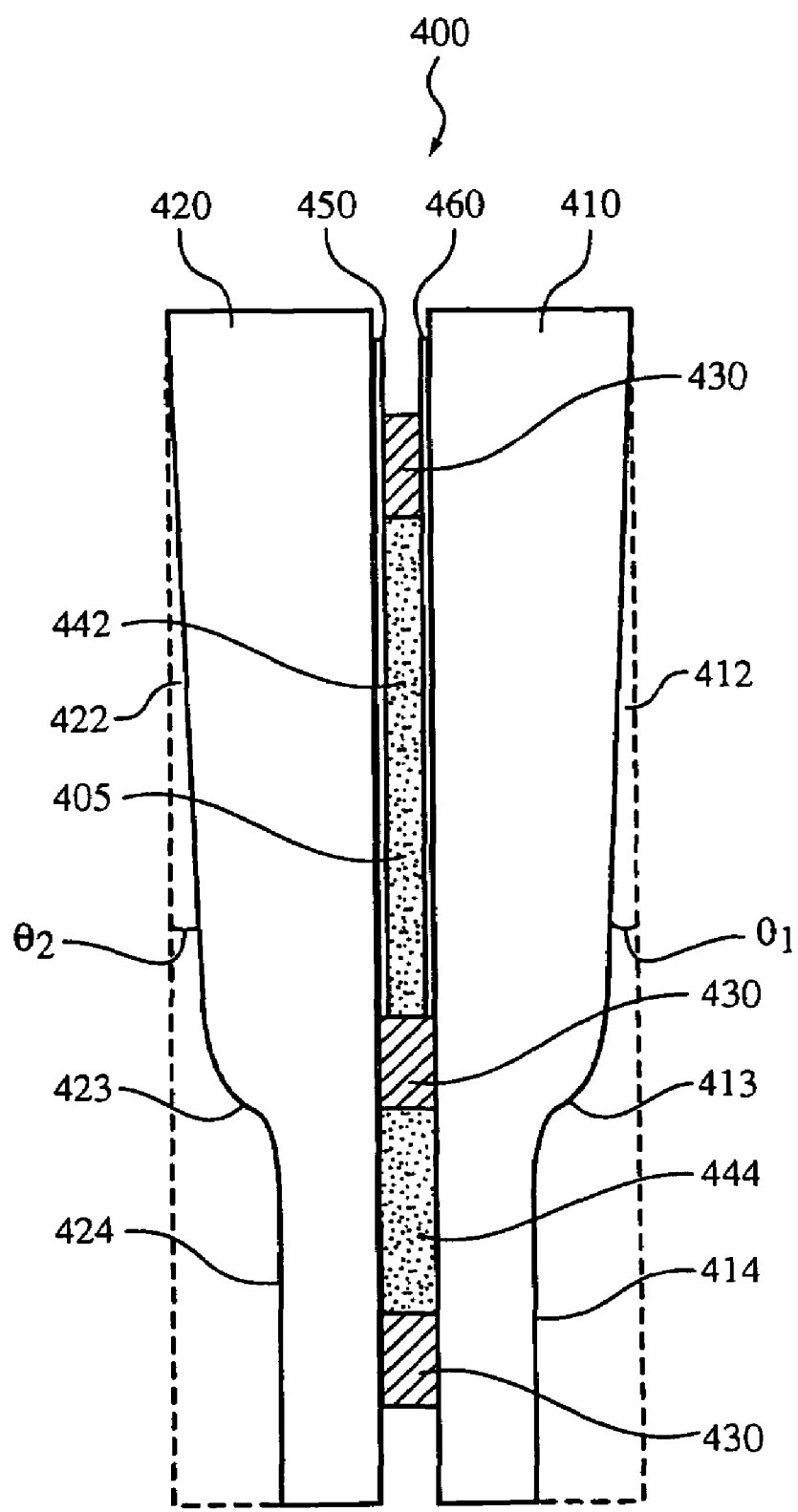
FIG. 4 is a side view of a liquid crystal device with an integral wedge and stress relief on both substrates.

Referring to FIG. 4, a cross sectional view of a liquid crystal device 400 is shown. Device 400 includes two substrates 410 and 420 joined by adhesive bead 430. A first portion 412 of the substrate 410 has a wedge of angle $\theta_1$. Furthermore, substrate 410 has a second portion 414 that is substantially thinner than first portions 412 or 422. Similarly, substrate 420 has a first portion 422 that is wedged with angle $\theta_2$ and a second portion that is substantially thinner than first portions 422 and 412. The second portions provide a stress relief function for the device and the wedged first portions reduce optical interference and fringing. The device includes electrodes 450 and 460. Some embodiments of device 400 are transmissive type cells and some embodiments are reflective type cells. The wedge angles $\theta_1$ and $\theta_2$ can be different and the wedge axes can be opposite, orthogonal or even at some arbitrary angle to the plane of the substrates. Such choices typically depend on the intended use of the device. In some embodiments of device 400, the dual stress relief of substrates 414 and 424 of device 400 also affords greater design flexibility. Both portions 414 and 424 provide stress relief and thus for a given area, portions 414 and 424 together provide roughly twice as much as expansion volume as available with portion 114 in device 100. In some applications, especially where device size becomes important such design flexibility can be useful.

Figure 5A:
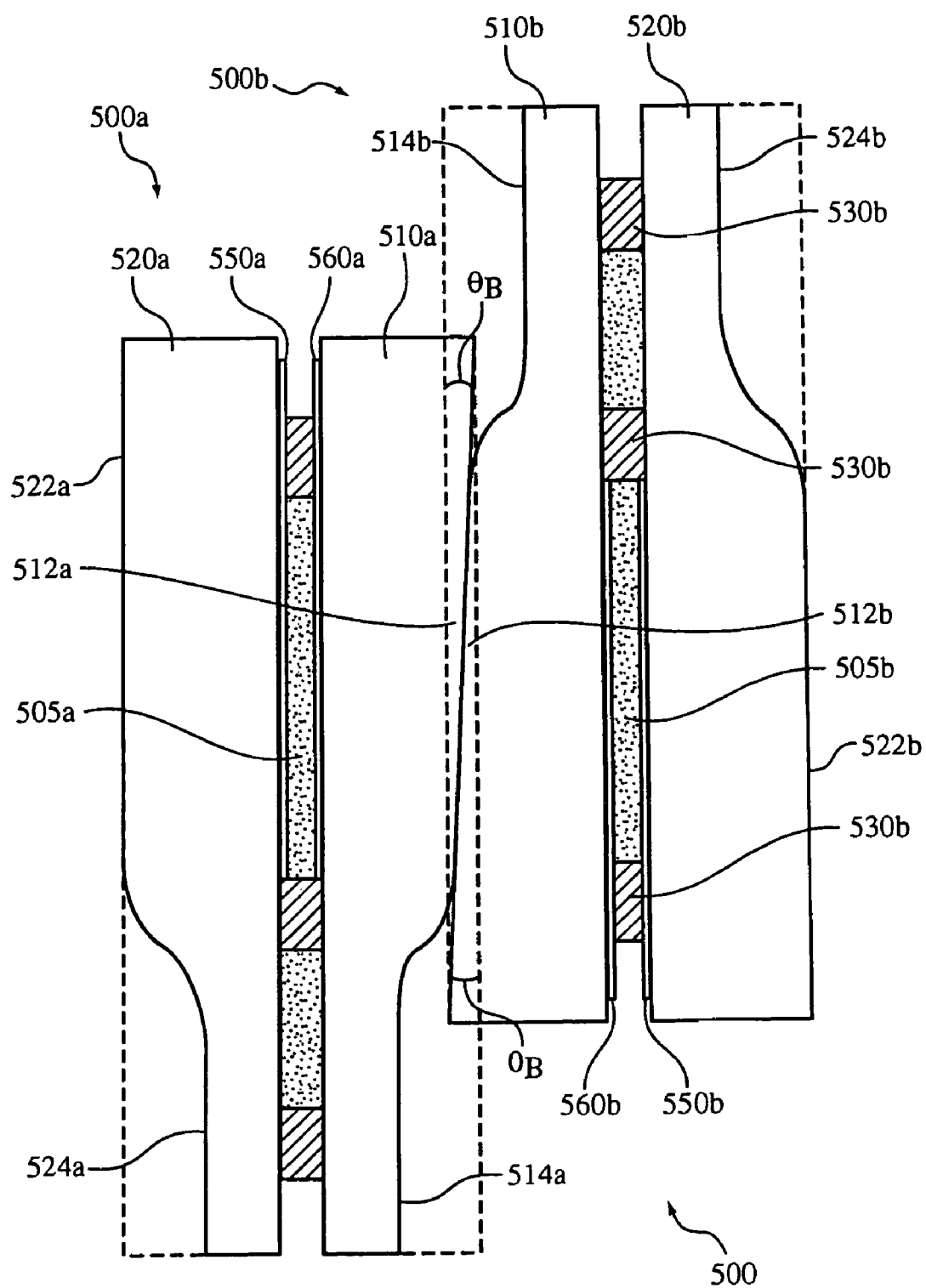
FIG. 5A is a side view of a composite liquid crystal device with integral wedged substrates and stress relief.

The liquid crystal devices similar to devices 100, 200, 300 or 400 are stacked in series with similar liquid crystal devices or with other optical elements to provide a composite liquid crystal device. Referring to FIG. 5A, a composite liquid crystal device 500 is shown. The composite device includes two liquid crystal devices 500a and 500b that are similar to device 400. Device 500a includes substrates 510a and 520a joined by adhesive bead 530a. The device 500a includes electrodes 550a and 560a. A first portion 512a of the substrate 510a has a wedge of angle $\theta_A$. Furthermore, substrate 510a has a second portion 514a that is substantially thinner than first portions 512a or 522a. The second portions provide a stress relief function for the device and the first wedged portions reduce fringing and interference. Device 500b includes substrates 510b and 520b joined by adhesive bead 530b. The device 500b includes electrodes 550b and 560b. A first portion 512b of the substrate 510b has a wedge of angle $\theta_B$. Furthermore, substrate 510b has a second portion 514b that is substantially thinner than first portions 512b or 522b. The second portions provide a stress relief function for the device and the first wedged portions reduce fringing and interference. As shown in FIG. 5A, the two devices 500a and 500b are stacked such that the stress relief portions 544a and 544b are directed in opposite directions but the relative orientation of the stress relief portions can be varied to suit the specific application. The stacked devices may be joined by using an index matched adhesive, or optical contact binding, or by other known techniques for bonding the devices together. Furthermore, the wedges of device 500 (i.e., surfaces 512a, 512b, 522a, and 522b) can have differing angles and orientations. As noted before, fringing occurs between pairs of interfaces and thus device 500 has not only intra cell pairs of surfaces but also inter cell pairs of surfaces. By considering the spacing of pairs of surfaces in the composite device including surfaces from elements such as retarders, polarizers, and or waveplates, choices in wedging angles and orientations are made that minimize the fringing and interference effects within the composite device. Such choices and the resulting performance of the optical device can be tested using known ray tracing techniques. Although composite device 500 is shown in FIG. 5A with only two devices stacked together, in other embodiments multiple liquid crystal devices can be stacked and interleaved with multiple other optical elements. For example, an element such as a retarder, polarizer or waveplate can be sandwiched between the liquid crystal cells. Furthermore, the liquid crystal devices that form the composite device can be combinations of transmissive and reflective cells.

As devices are stacked together, the contacting regions mechanically support each other. In some embodiments, the design of liquid crystal cells for a composite device incorporates this fact. The mechanical engineering calculations discussed above can consider the additional mechanical support provided by elements other than the substrates of each device alone. In some embodiments, such considerations allow the reduction of the substrate thickness in the contacting region since the mechanical support of the adjacent structures allows for thinner substrates.

Figure 5B:
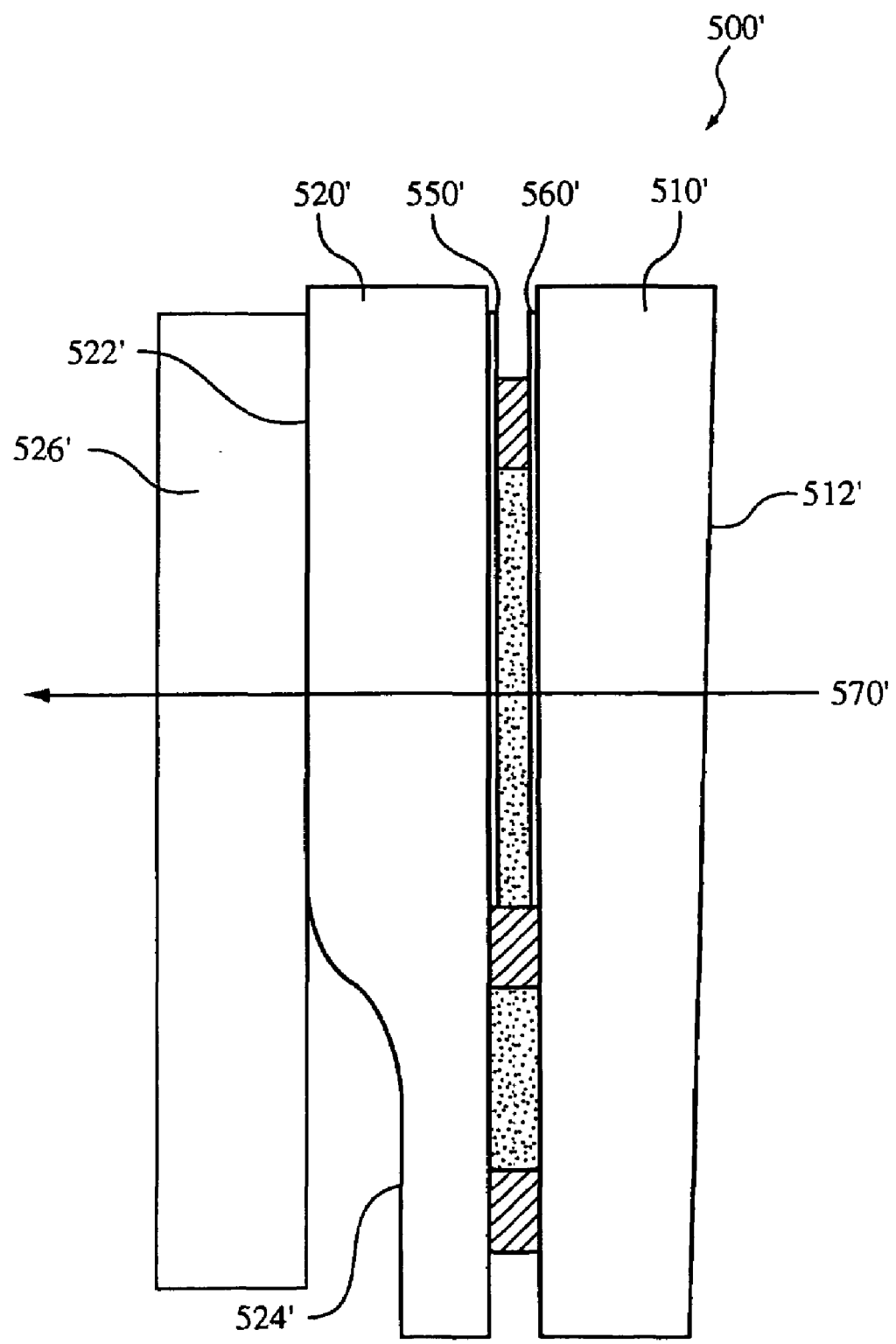
FIG. 5B is a side view of a transmissive liquid crystal device with an integral wedged substrate, a substrate with a stress relief portion, and an external stiffener.

In some embodiments, external components are attached to a substrate in order to mechanically stiffen the substrate. Referring to FIG. 5B, a liquid crystal device 500' is shown. The device includes substrates 510' and 520'. Substrate 510' includes a wedged portion 512' and substrate 520' includes a stress relief portion 524'. The device includes transparent electrodes 550' and 560'. Device 500' includes an external component 526' that is attached to the optical portion 522' of substrate 520'. In this particular embodiment, the external component includes an optical window that is transparent as indicated by transmitted light beam 570'. The external component stiffens the optical display portion of the device and thus reduce pressure induced variations in the liquid crytsal thickness. Even in embodiments wherein the external component extends past the connecting portion 523' as shown, the external component does not compromise the stress relief function of portion 524' by physically blocking the expansion of portion 524'. The external component may provide a convenient location for attaching the device to a housing. As noted previously, in some embodiments an external optical component may be added to the substrate, therefore, in those embodiements, external component 526' can be an external optical component that provides both a mehcanical and optical function to the device.

Figure 5C:
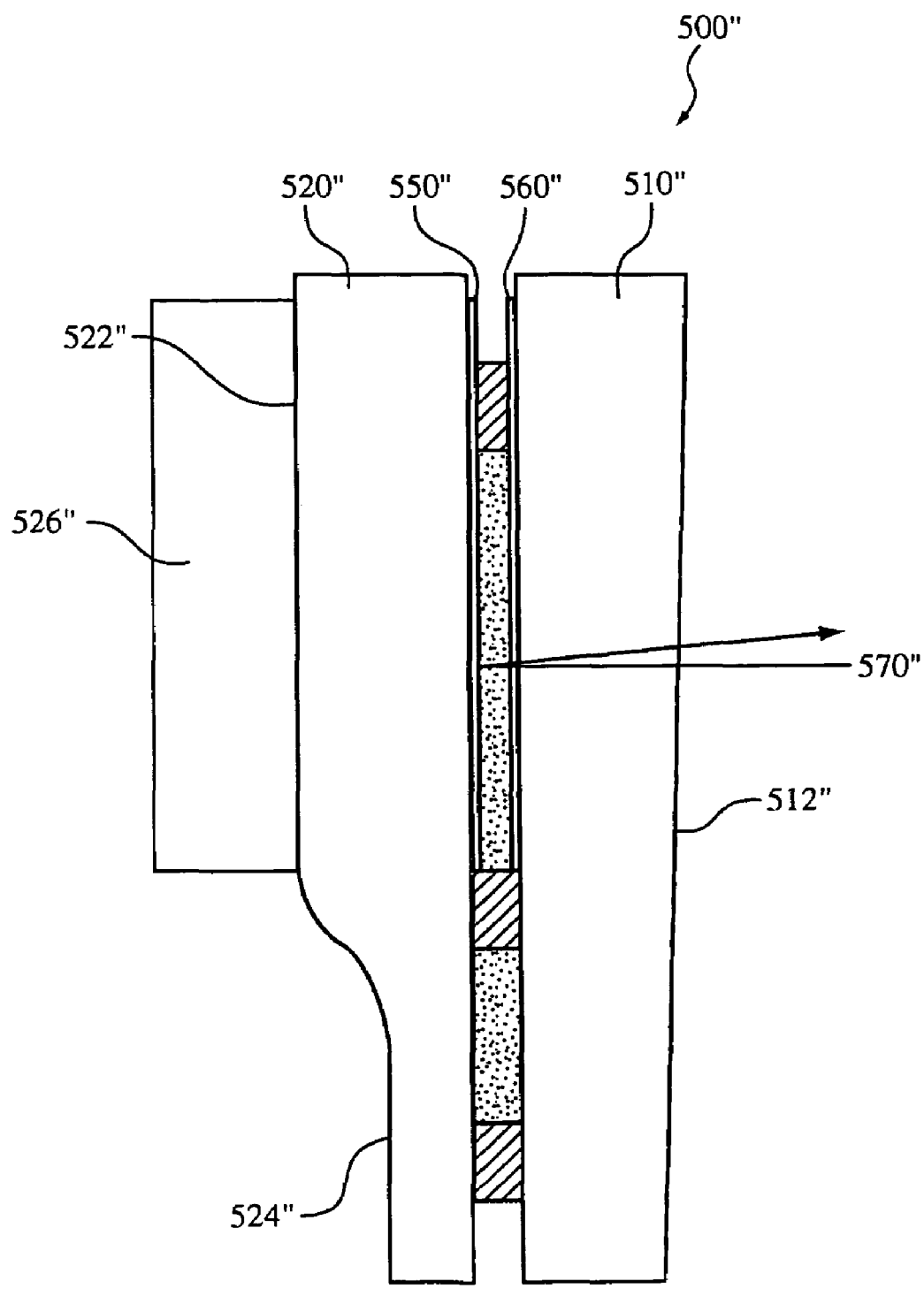
FIG. 5C is a side view of a reflective liquid crystal device with an integral wedged substrate, a substrate with a stress relief portion, and an external stiffener.

In other embodiments, the external component need not be a transparent element. Referring to FIG. 5C, a relfective liquid crystal cell 500" is shown. The device includes substrates 510" and 520". Substrate 510" includes a wedged portion 512" and substrate 520" includes a stress relief portion 524". The device includes transparent electrode 560" and reflective electrode 550". Device 500" includes external component 526" that is attached to the optical portion 522" of substrate 520". The external component stiffens the optical display portion of the device and thus reduce pressure induced variations in the liquid crytsal thickness. Because the device is a reflective device configured as shown, note beam path 570", the external component 526" need not have a transparent window and thus can be a metal or other suitable material that stiffens the portion 522". The external component also provides a handle for attaching the device to a housing.

Figure 6:
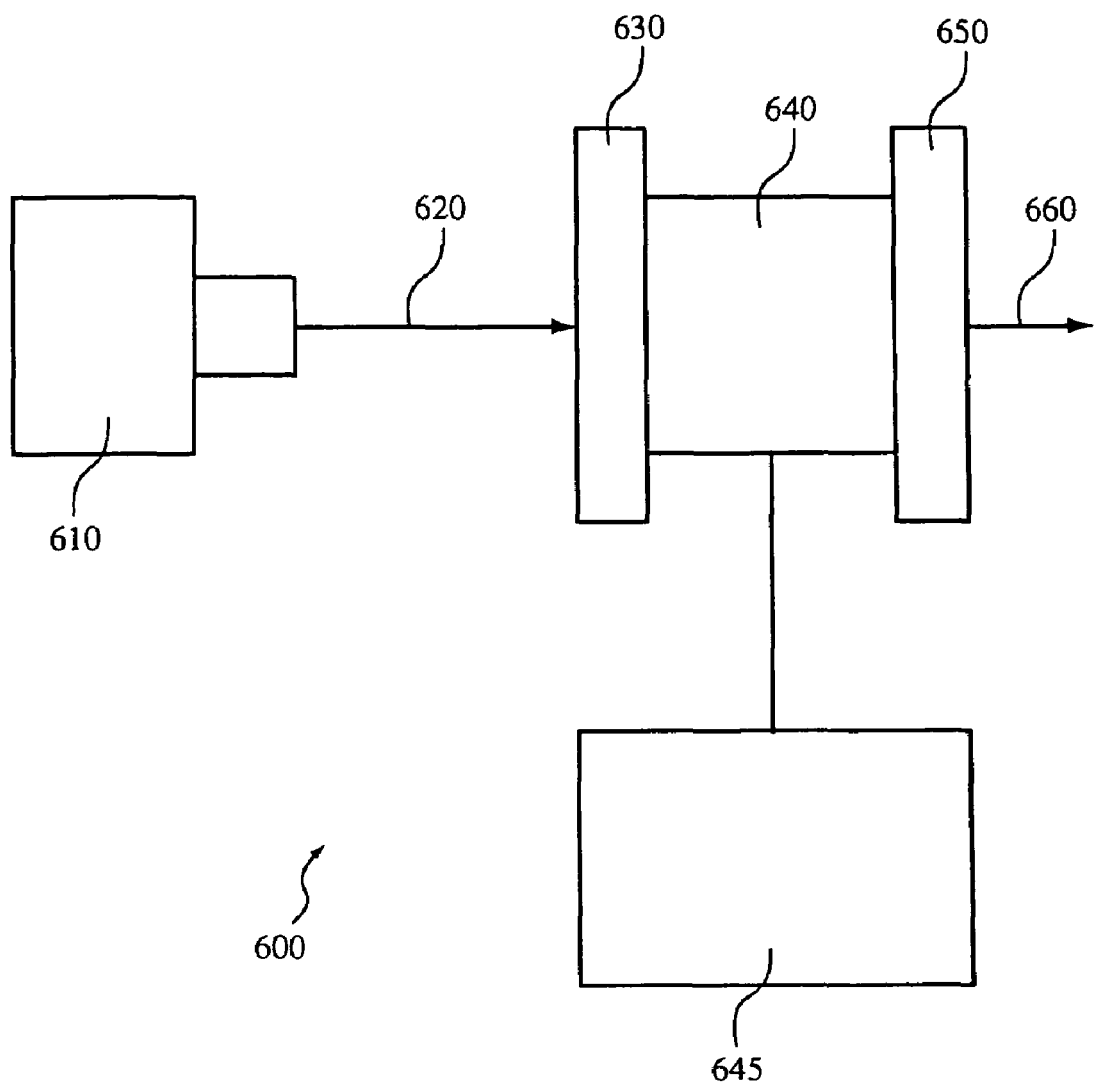
FIG. 6 is a system that uses a liquid crystal device.

Referring to FIG. 6, a system 600 that uses a liquid crystal device is shown. System 600 includes a light source 610 that produces light beam 620. The light beam 620 passes through optical element 630 that may be for example a retarder, polarizer or waveplate. The light beam interacts with liquid crystal device 640. Device 640 can be any of the single or composite liquid crystal devices discussed above. Controller 645 controls the voltages of the liquid crystal device electrodes (not shown). After being output by the liquid crystal device 640, the light passes through optical element 650 that may be for example a retarder, polarizer or waveplate, resulting in output light beam 660. Although schematically drawn as a transmissive device, in other embodiments the liquid crystal device 640 may be either transmissive or reflective.

For example, in some embodiments, the device 640 is stacked in series with a fixed optical retarder 630. Such a retarder is placed in series with the device and oriented with its slow axis either parallel to or perpendicular to the retarder axis of the liquid crystal device. Often such configurations are used to compensate for the residual retardance of the liquid crystal device that remains even at high applied voltages. The fixed retardance effectively can cancels the residual retardance of the device and produce a device with zero retardance, or some other desired retardance as may be required by the task at hand.

Figure 7:
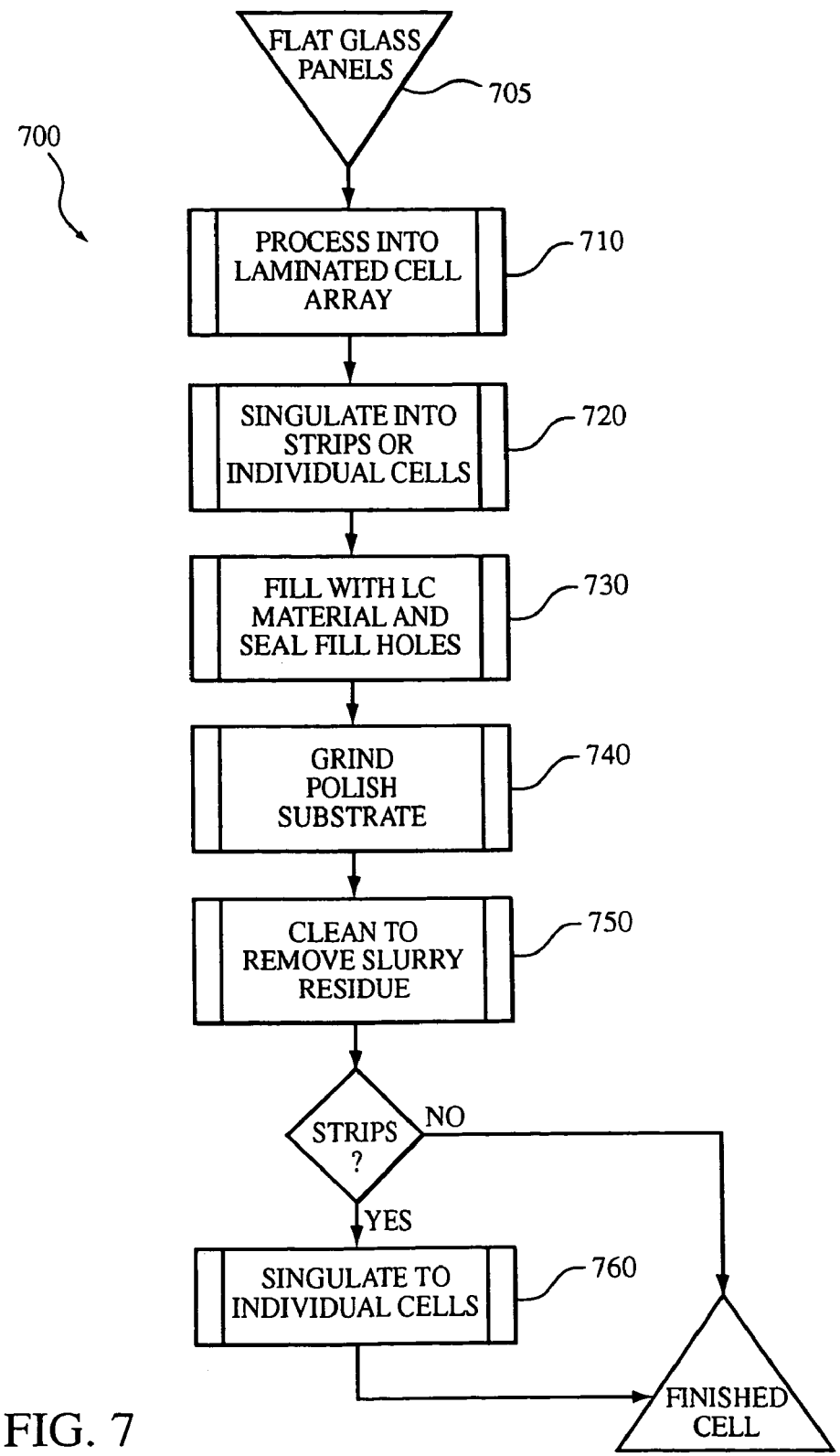
FIG. 7 is a flow chart of a method for forming liquid crystal devices.

The above discussion outlines several embodiments of liquid crystal devices, now we turn to a discussion of the methods for forming these devices. Referring to FIG. 7, a flowchart outlines method 700. The method preferably begins by obtaining two panels (Step 705). The positioning and manipulation of these panels uses known manufacturing techniques and equipment and therefore for ease of manipulation and precision placement and alighnnent, the panels are preferably flat planar panels. The method processes the two panels into a laminated array of cells (Step 710). Typically a dispenser forms an array of adhesive beads by repeatedly depositing adhesive beads onto one of the panels in a tiled pattern. The other panel is placed onto the bead and the two panels are joined together. Spacers can be used to provide an exact and uniform spacing between the two glass panels. Typical panels sizes are, for example, about 1 mm thick and 50 to 600 mm on a side. The spacing between the substrates is, for example, about 1 µm to about 30 µm.

These arrays can be 1×1, 1×n, or m×n sized arrays. The method is amenable to mass production of the liquid crystal devices. The processing of a single array panel with m×n individual devices highlights the efficiency of the method. All m×n devices are moved, positioned, and processed at the same time. This increases reliability and throughput. Optionally, the panelized assembly of cells is partially singulated into strips of cells or completely singulated into individual cells (Step 720). Typically a scribe or a laser singulates the panelized assemblies. Using either the individual cells or the partially singulated strips each cell is filled with liquid crystal and the fill hole is subsequently sealed (Step 730). In other embodiments discussed below, the filling and or singulating of the cells is performed later in the method.

Figure 8A:
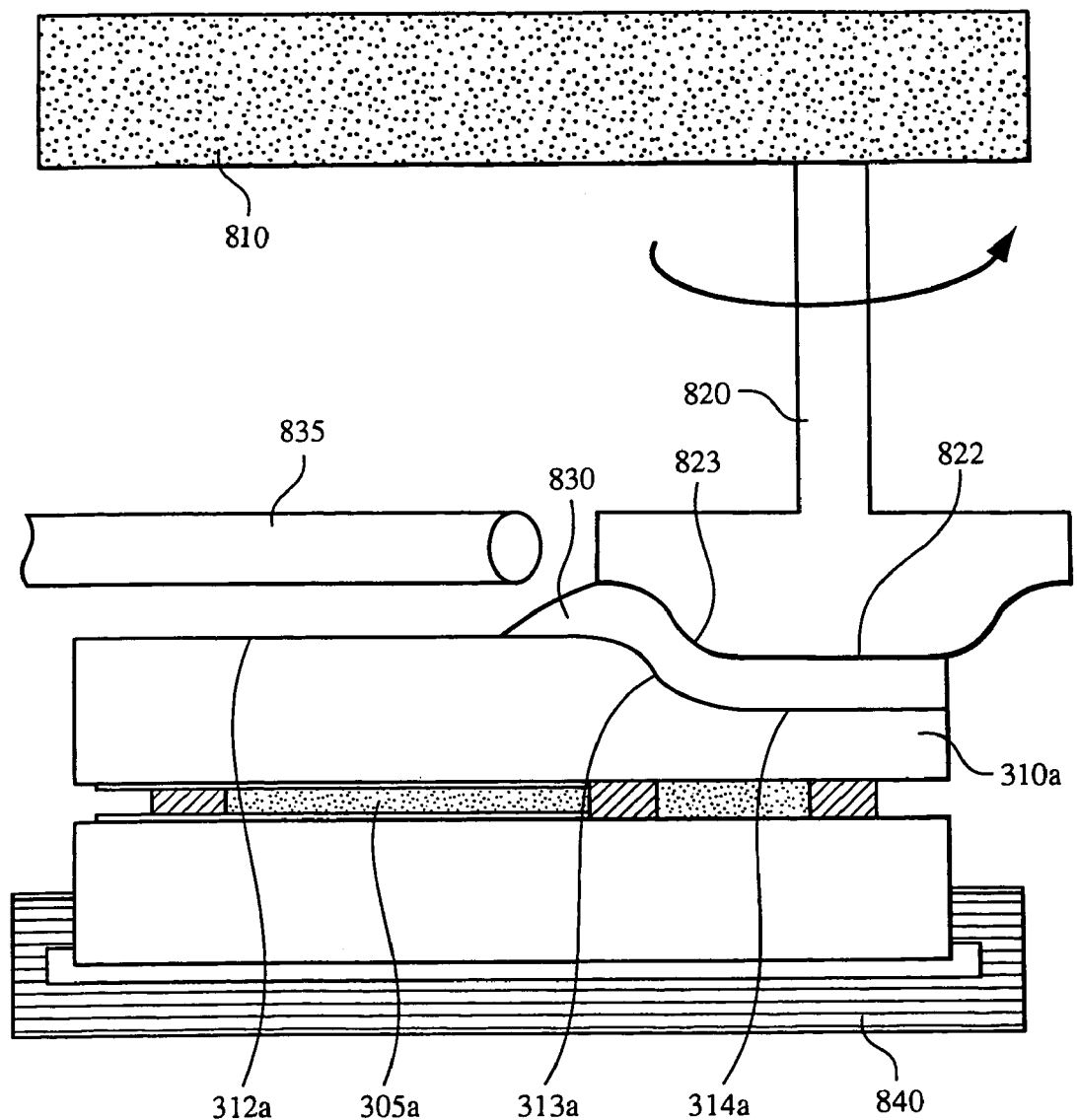
FIG. 8a is a schematic diagram of an apparatus for grinding a stress relief portion of a liquid crystal device.

A grinder and/or polisher grinds or polishes the surface of a substrate (Step 740). The grinding and polishing is applied to one or both substrates of the device. Either substrate can be ground or polished to form either one or both of a wedged portion or a stress relief portion in the substrate. Referring to FIG. 8a, a schematic diagram of an apparatus for grinding a stress relief portion of a substrate is shown. A grinder 800 removes material from the surface of a substrate 310a. The grinder 800 includes a chuck 840 that holds the liquid crystal device or the substrate while plate 820 moves with an orbital motion relative to substrate 310a. Positioner 810 maintains the relative position and orientation of plate 820 with respect to substrate 310a. A grinding slurry 830 is introduced to the surface of substrate 320 by slurry injector 835. Typically the slurry 830 includes an abrasive compound. The orbital action of the plate relative to the surface 320a in conjunction with the slurry grinds away material from the surface. The polishing plate 820 includes a flat 822 and a connecting portion 823. The flat and connecting portion are designed such that as the material is removed, both a thinner second portion 314a is formed and an additionally a connecting portion 313a is formed. As the second portion 314a provides the stress relief for the device, the surface of the second portion need not be smooth enough for high precision optical performance. Thus while the second portion is being formed, the grade of abrasive is chosen to remove material efficiently. In the preferred embodiment, the liquid crystal cells are filled and sealed prior to the grinding of step 740. This provides a number of advantages. The liquid crystal layer 305a provides hydrostatic support for the substrate and thus reduces device failure during grinding. Furthermore, the laminated device is typically stronger and more robust than the substrates alone and therefore the laminated substrate can be thinned substantially more than the substrate alone allowing for a greater flexibility in design of the devices. Furthermore, contamination, especially water contamination, of the empty volumes can be a problem. Therefore it is preferable to fill and seal the devices soon after the substrates are laminated together.

Figure 8B:
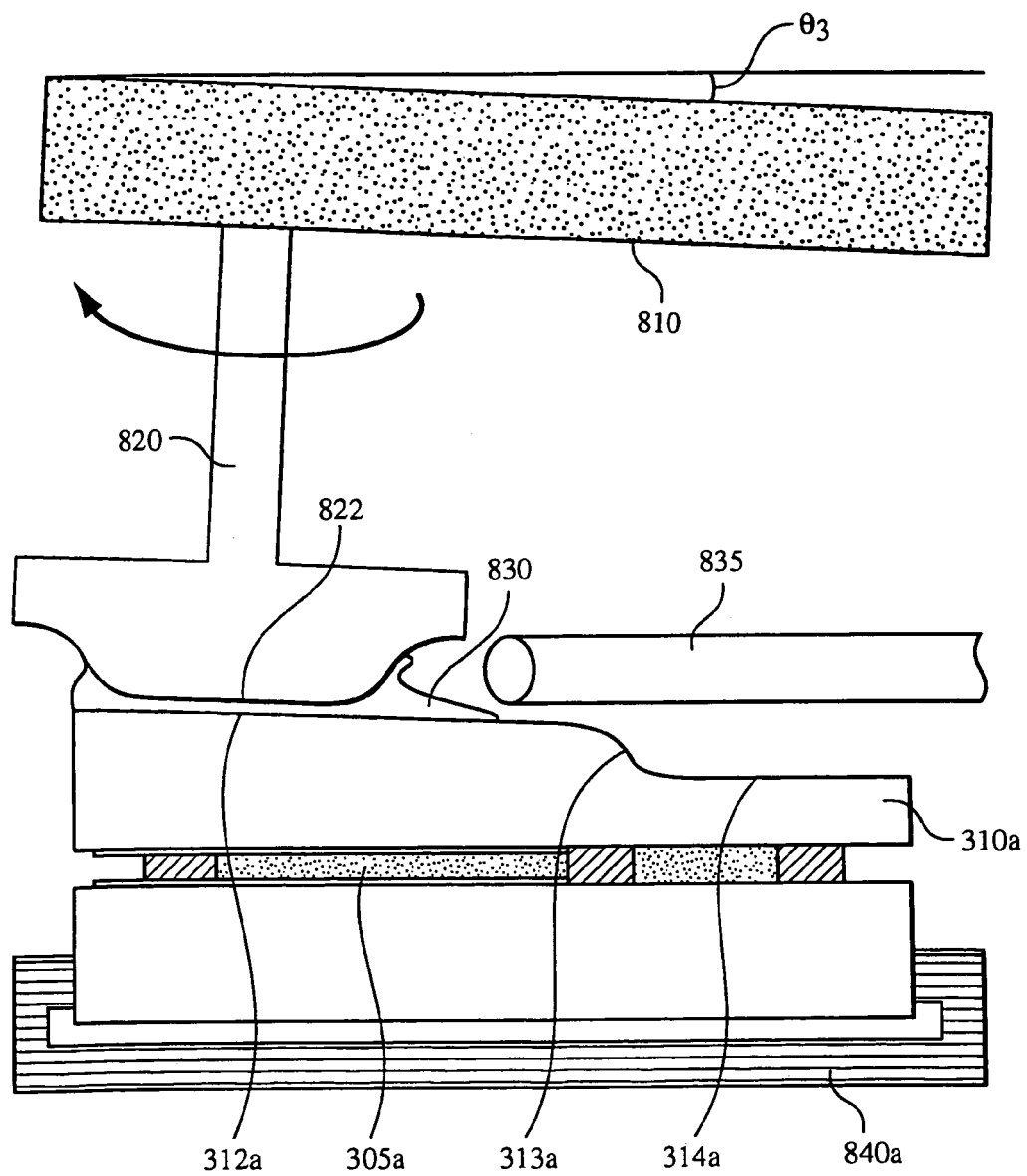
FIG. 8b is a schematic diagram of an apparatus for grinding and polishing a wedged portion of a liquid crystal device.

Referring to FIG. 8b, a schematic diagram of the grinding apparatus being used for wedging a portion of a liquid crystal device is shown. After grinding the second portion of the substrate, the plate 820 is tilted relative to substrate 310a. The tilt angle $\theta_3$ is determined by the amount of wedge that is desired. The chuck 840 moves the cell relative to the plate such that the plate is positioned over a first portion 322a of the substrate. Again the orbital motion of the plate relative to the substrate in conjunction with the slurry removes material to form the desired wedge on the surface of the first portion. The first portion is typically the optical portion. As the substrate material is removed, the slurry injector 835 introduces finer and finer grades of abrasives. This polishing step produces a surface of suitable flatness and surface smoothness for precision optical applications. For example, a standard optical finish is flat to 1/10 wave, with smoothness of a few nm. In some embodiments, the polishing uses another machine built specifically for that purpose.

In embodiments that fill and seal the cells before grinding, the temperature of the substrate, the liquid crystal layer 305a and preferably the entire cell are preferably maintained at a constant temperature. Typically this temperature is close to the desired operating temperature of the device. Excessive temperature or temperature variation during the grinding and polishing produce pressures due to the expanding liquid crystal layer as described above. If the optical portion of the substrate is deflecting during the grinding/polishing process then, once the liquid crystal layer cools and the deflection eases, the surface may no longer be flat. To avoid this, the temperature of the cell is controlled during the grinding and polishing of the first portion. Typically, the grinding and polishing maintains the temperature to within 5° C. of the nominal operating temperature. In some embodiments, the slurry injector 835 regulates the temperature of the injected slurry in order to control the temperature of the device.

In one embodiment, the grinder/polisher 800 is a planetary, single-face polisher with a slurry that includes diamond paste and high purity ethylene glycol. Typically plate 820 is made of copper. A minimal amount of slurry is typically used so that there is minimal contamination of the side and back faces of the liquid crystal cells by the slurry.

Typically, planar glass substrates of about 1 mm thick are used. The grinding and polishing described in step 740 can form the structures in the substrates before or after the individual cells are filled and sealed. In yet other embodiments, the grinding and polishing can be applied to substrates before lamination. In all of these embodiments, the methods forming either one or both of stress relief portions and wedged portions in the substrates can be used to efficiently produce these structures in large numbers.

Figure 8C:
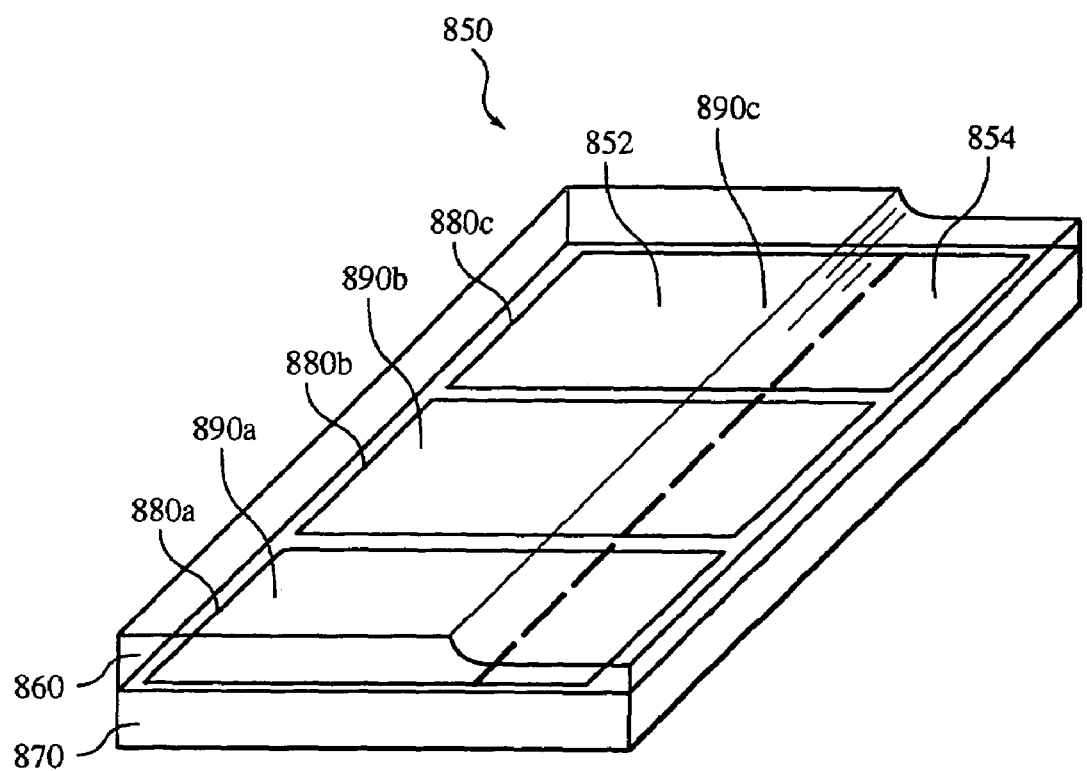
FIG. 8c is a perspective view of a liquid crystal array with an integral stress relief portion formed into a substrate.

An example of the mass production of the cells is shown in FIG. 8C. A strip array of liquid crystal cells 850 is shown after completion of the grinding in step 640 of method 600. The strip array 850 includes two substrates 860 and 870. The substrates are laminated with adhesive beads 880*a*, 880*b* and 880*c*. The substrates and the beads enclose the liquid crystal layers 890*a*, 890*b*, and 890*c*. In the embodiment shown in FIG. 8*c*, the device has a stress relief portion 854 formed in substrate 860. Other embodiments have one or both of stress relief and wedging in one or both substrates.

In yet other embodiments, the wedge and or the stress relief portion of the substrate can be formed using methods other than grinding or polishing. Other well-known methods for forming the structures in substrates are machining, etching, cutting, sawing, casting, extruding, and molding.

Once the desired wedge or stress relief portion is formed in one or both of the substrates, the devices are cleaned to remove the slurry residue (Step 750). If the panels were singulated into individual cells in step 720, then the cells are complete. If instead the panels were cut into strips, then the cells are singulated into individual cells (Step 760). In embodiments that skipped either one or both of the steps of singulating and filling the individual cells, the panels are singulated into strips or cells (if not done so already) and the cells are filled and sealed. Typically a scribe, dicing saw, or a laser singulates the panelized assemblies.

In some embodiments, fixed optical devices such as retarders, polarizers, or waveplates, are joined to a substrate of a panelized array before it is singulated into strips or cells. As the panels are processed and singulated, the cells that are produced from such a panel have a fixed optical element already joined to them. This is accomplished in essentially one step as opposed to separately joining each final cell with its own fixed optical element.

Figure 9A:
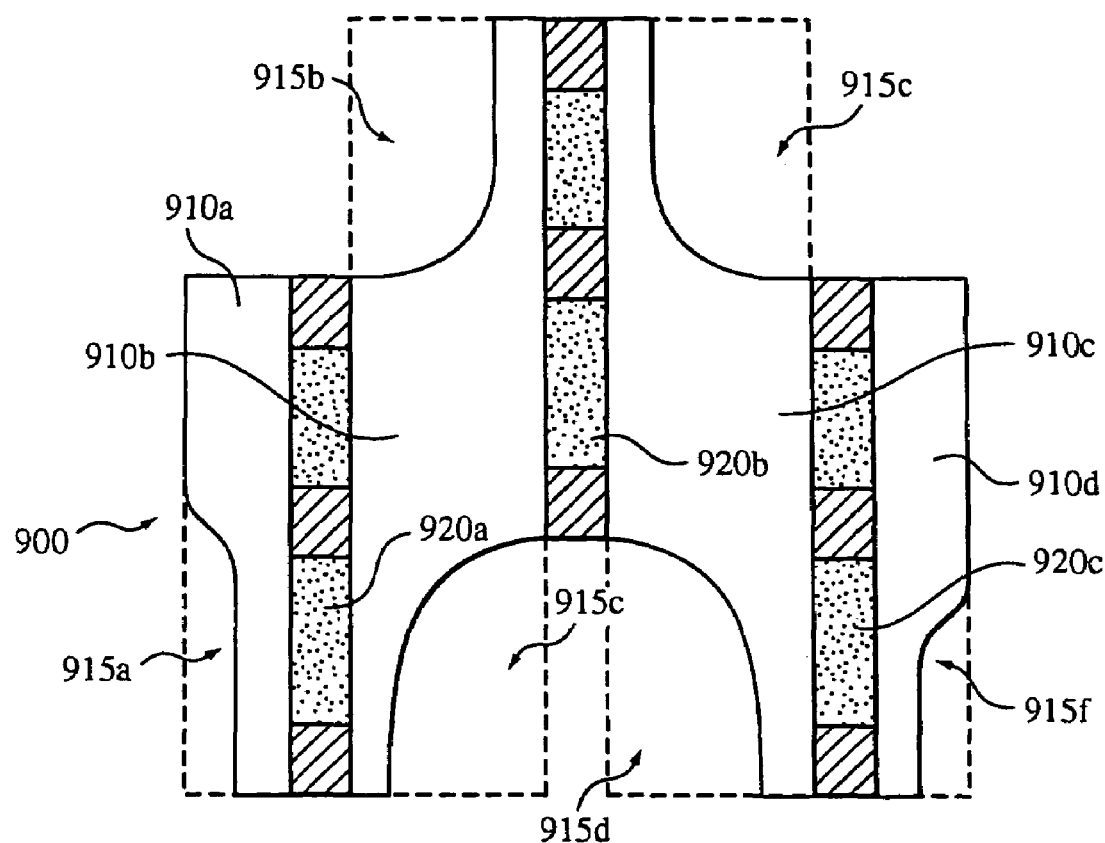
FIG. 9A–B are side views of alternate embodiments of composite liquid crystal devices. Like reference symbols in the various drawings indicate like elements.
Figure 9B:
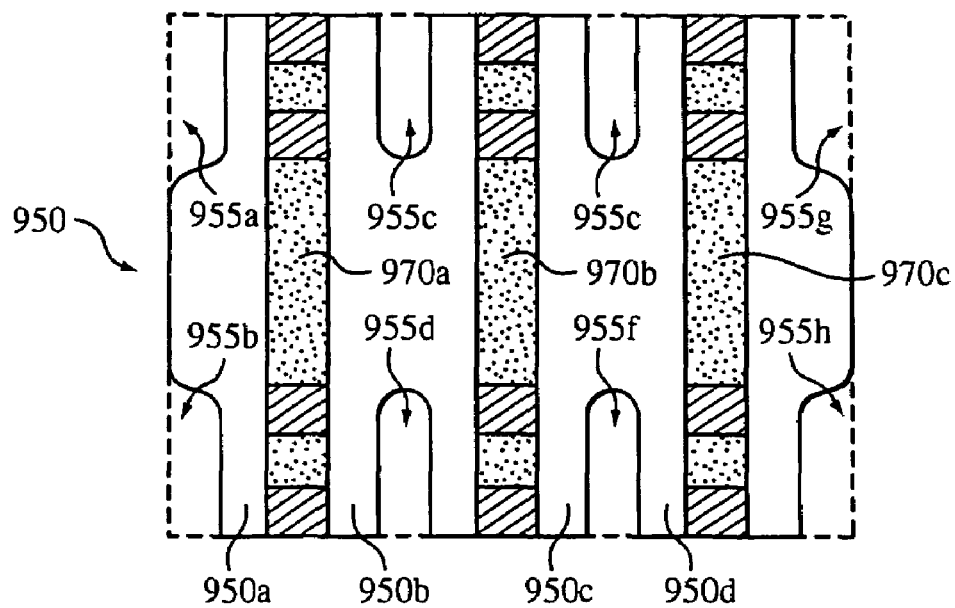

In the discussion of composite device 500 a composite device typically is formed from individual devices that are subsequently bonded together to form the composite device. Referring to FIGS. 9*a* and 9*b*, alternate embodiments of composite liquid crystal devices are shown. FIG. 9*a* shows composite device 900. The device includes substrates 910*a*, 910*b*, 910*c*, and 910*d* that sandwich adhesive beads 930*a*, 930*b*, and 930*c*. Regions 915*a*, 915*b*, 915*c*, 915*d*, 915*e*, and 915*f* form stress relief regions for liquid crystal layers 940*a*, 940*b*, and 940*c*. Methods similar to those described above are employed to form such devices. Grinding, polishing, machining, etching, cutting, sawing, casting, extruding, or molding can form the regions 915*a*, 915*b*, 915*c*, 915*d*, 915*e*, or 915*f*. Similarly, FIG. 9*b* shows a composite device 950. The device includes substrates 950*a*, 950*b*, 950*c*, and 950*d* that sandwich adhesive beads 960*a*, 960*b*, and 960*c* and liquid crystal layers 970*a*, 970*b*, and 970*c*. Regions 955*a*, 955*b*, 955*c* 955*d*, 955*e*, 955*f*, and 955*h* provide stress relief for the liquid crystal layers. The composite devices 900 and 950 can also have other optical elements such as polarizers or retarders interleaved in the composite device.

Although devices 900 and 950 provide for a reduction in the number of interfaces compared to a similar device 500, devices 900 and 950 are typically more difficult to manufacture by putting increasingly strict demands on positioning and manipulation of the devices as each part of the composite sandwich is formed. In the previous embodiments, the grinding and or polishing is along an axis that is normal with the faces of the substrates. In some embodiments of devices 900 and 950, grinding, polishing, or sawing along an axis that is parallel to substrates can also form the stress relief structures shown. Although not shown, the faces of the substrates in devices 900 and 950 are amenable to optical wedging. In such embodiments, the substrates are wedged prior to lamination into the composite device.

A number of embodiments of the invention have been described. Nevertheless, it will be understood that various modifications may be made without departing from the spirit and scope of the invention. Accordingly, other embodiments are within the scope of the following claims.

What is claimed is:

1. A liquid crystal device comprising:
   two unitary substrates sandwiching a layer of liquid crystals, wherein each substrate supports at least one electrode, wherein a first one of the substrate has a first region that is substantially thinner than a second region of the first substrate, and wherein the first region of the first substrate has a thickness less than 1.2 mm.

2. The device of claim 1, wherein the first region of the first substrate is sufficiently thin relative to the second region of the first substrate to relieve stress caused by thermal expansion and contraction of the liquid crystals over a range of operating temperatures.

3. The device of claim 2, wherein the range of operating temperatures spans at least 30° C.

4. The device of claim 3, wherein the range of operating temperatures is from about 5° C. to at least 70° C.

5. The device of claim 2, wherein the second region of the first substrate is at least 20% thicker than the first region of the first substrate.

6. The device of claim 5, wherein the second region of the first substrate is twice as thick as the first region of the first substrate.

7. The device of claim 1, wherein the first substrate comprises a wedge.

8. The device of claim 7, wherein wedge comprises the thinner first region and the thicker second region.

9. The device of claim 8, wherein wedge defines a wedge angle of at least 0.25°.

10. The device of claim 7, wherein the wedge reduces interference effects caused by an undesired reflection from the first substrate during use of the liquid crystal device.

11. The device of claim 7, wherein the first region of the first substrate is sufficiently thin relative to the second region of the first substrate to relieve stress caused by thermal expansion and contraction of the liquid crystals over a range of operating temperatures.

12. The device of claim 11, wherein the wedge extends over at least a portion of the second region.

13. The device of claim 1, wherein the second substrate comprises a first region that is thinner than a second region of the second substrate.

14. The device of claim 1, wherein the first region of the first substrate has a thickness less than 1.0 mm.

15. The device of claim 1, further comprising an optical component secured in optical series with at least a portion of the liquid crystal layer.

16. The device of claim 15, wherein the optical component is a retarder.

17. The device of claim 15, wherein the optical component is a polarizer.

18. The device of claim 15, wherein the optical component is another liquid crystal cell.

19. The device of claim 18, wherein the optical component is an optical window.

20. The device of claim 1, further comprising a stiffening component secured to at least a portion of one of the substrates.

21. A liquid crystal device comprising:

two unitary substrates sandwiching a layer of liquid crystals, wherein each substrate supports at least one electrode, wherein the first substrate has a first region that is substantially thinner than a second region of the first substrate, and wherein the first region of the first substrate is sufficiently thin relative to the second region of the first substrate to relieve stress caused by thermal expansion and contraction of the liquid crystals over a range of operating temperatures.

* * * * *